Sept. 17, 1968   B. L. FISHBAUGH   3,401,515

HAY RAKE TOOTH

Filed Feb. 4, 1966

INVENTOR.
BYRON L. FISHBAUGH

BY J. B. Holden
ATTORNEY

United States Patent Office 3,401,515
Patented Sept. 17, 1968

3,401,515
HAY RAKE TOOTH
Byron L. Fishbaugh, St. Marys, Ohio, assignor to The Goodyear Tire & Rubber Company, Akron, Ohio, a corporation of Ohio
Filed Feb. 4, 1966, Ser. No. 525,174
3 Claims. (Cl. 56—400)

This invention relates to a hay rake tooth mounting structure for use on a wheel-type hay rake.

The tooth structure of this invention is specifically designed for mounting on the periphery of the wheel rim of a wheel rake of the general type shown in U.S. Patent 2,712,723 issued to K. P. Ryan and in U.S. Patent 2,722,799 issued to M. R. Cooley. This type of rake differs in many respects from the so-called "bar rake" which has a plurality of resiliently mounted teeth projecting downwardly from one or more horizontal bars mounted on a rake body or frame. For example, as the teeth on the wheel rake contact the ground, in addition to gathering the crop being harvested, they cause rotation of the wheels due to their oblique angle of inclination with respect to the direction of travel of the rake.

The teeth of wheel rakes require a different mounting structure from that used on bar rakes not only because of the different shape of the structure they are mounted on but also because wheel rake teeth are subject to different kinds of compound stresses than those imposed on bar rake teeth. In addition, since the wheel rake teeth are much shorter than bar rake teeth and therefore there is less flexing of the teeth per se, hence there must be more flexing of the mounting structure.

In the past various types of springs or rubber mountings have been used in conjunction with brackets to mount rake teeth on bars or wheels of hay rakes. These have not always been of sufficient resiliency to prevent bending or breaking of the teeth and in many instances have not demonstrated sufficient durability over long periods of extensive use.

It is a primary object of this invention to provide a rake tooth with a resilient elastomeric mounting block of greater durability to withstand the compound stresses imposed on wheel rake teeth while permitting flexing of the teeth at the mounting block to prevent permanent bending or breaking of the teeth when they contact the ground or other objects.

Figure 1:
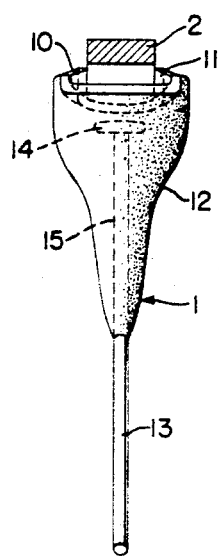
FIG. 1 is an end view of a typical tooth of the invention.
Figure 2:
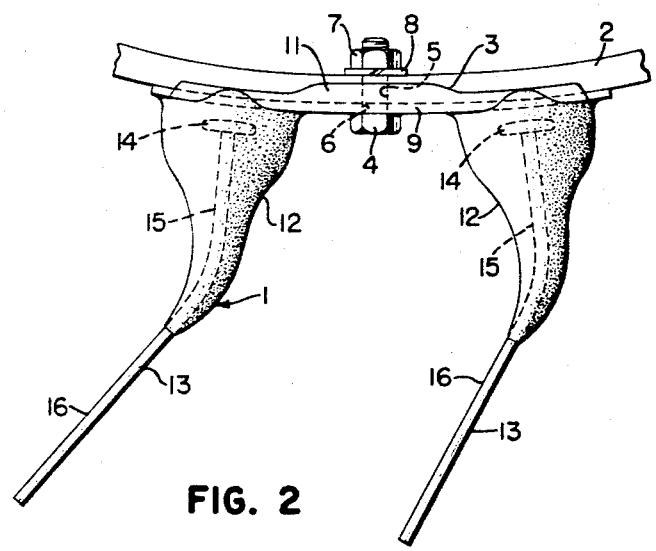
FIG. 2 is a side elevational view of the invention.
Figure 3:
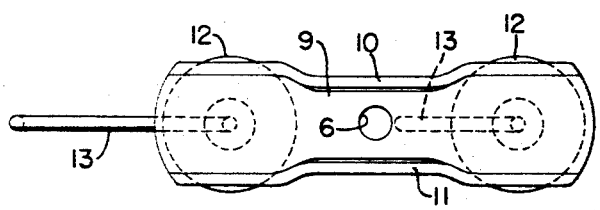
FIG. 3 is a plan view of the invention with the wheel rim omitted for clarity.

In one embodiment of the invention as shown in FIGS. 1, 2, and 3, a pair of substantially identical hay rake teeth 1 are mounted as a unit on the outer periphery of a hay rake wheel rim 2 by means of a mounting clip 3 fastened thereto by a bolt 4 which passes through mating openings 5 and 6 in the rim 2 and clip 3, respectively, and is secured in position by a nut 7 and a lock washer 8.

The clip 3 is generally U-shaped in cross-section with a center portion 9 being of arcuate configuration along the length thereof to mate with the periphery of the rim 2. The legs, or flanges, 10 and 11 of the clip 3 extend radially inwardly from the edges thereof around the sides of the rim 2 to maintain clip 3 in alignment therewith. The clip 3 is laterally widened at each end to provide greater surface contact with the radially inner end of an elastomeric block 12. The flanges 10 and 11 are longer in the center portion 9 of the clip 3 and are surfaced so as to engage the sides of the wheel rim 2 in that area to prevent the clip 3 from turning with respect to the rim of the wheel.

Each tooth 1 includes a tine 13 with a head 14 on one end and an adjacent shank portion 15 embedded in one of the blocks 12 of elastomeric material such as rubber, either synthetic or natural. The block 12 is adhered to the radially outer face of the metal clip 3 at one end and an enlarged portion extends for substantially the entire width thereof. Preferably the block 12 is of a symmetrical cross-section and reduces in size in the end portion away from the clip 3 to provide proper flexibility and distribution of stresses in the rubber as flexing occurs. The block 12 and the embedded shank portion 15 of the tine 13 extend radially outwardly from the wheel rim 2 when the tooth 1 and mounting clip 3 are assembled thereon. A terminal end portion 16 of tine 13 extends outwardly from the shank portion 15 beyond the block 12 at an inclined angle to the shank portion 15. The terminal end portion 16 is inclined in a direction opposite to the direction of rotation of the wheel. This position of the tine 13 better enables it to withstand the bending forces to which it is subjected when it comes in contact with the ground or other objects. A plurality of the teeth assemblies as shown in FIGS. 1, 2 and 3 are attached in the manner shown to the rim 2 of the wheel so that preferably the teeth are uniformly spaced around the periphery.

Figure 4:
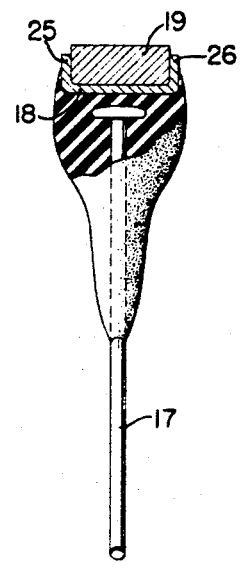
FIG. 4 is an end view partially broken away of another embodiment of the invention.
Figure 5:
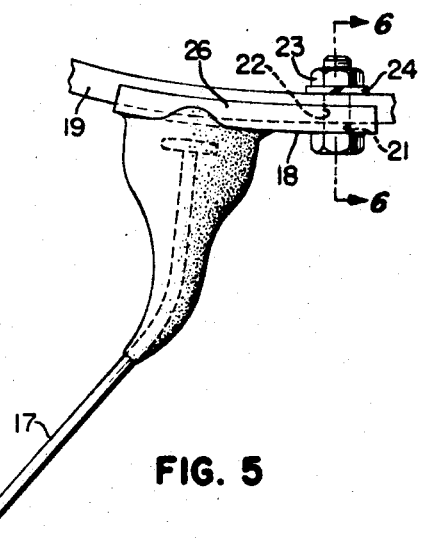
FIG. 5 is a side elevational view of the embodiment shown in FIG. 4.
Figure 6:
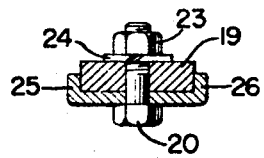
FIG. 6 is a cross-sectional view taken at line 6—6 in FIG. 5.

A second embodiment of the invention in FIGS. 4, 5 and 6 shows a tooth 17 similar to tooth 1 of the first embodiment but having only one tooth per clip 18 which in turn is fitted to the outer periphery of a wheel rim 19. The clip 18 is fastened to the rim 19 by a bolt 20 through mating openings 21 and 22 in the clip 18 and rim 19, respectively, and is secured in place by a nut 23 and a lock washer 24. The clip 18 is arcuately formed along the length thereof to conform to the wheel periphery and has upturned integral flanges 25 and 26 along the edges to engage the sides of the rim 19 and maintain the clip 18 in alignment therewith. The tooth 17 is attached to the surface of clip 18 near one end thereof and is similar in structure to previously described tooth 1 and will not be described in detail.

As may be seen from the drawings the primary difference in the two embodiments is that one embodiment shows a single tooth mounted on a clip and the other embodiment shows a pair of teeth mounted on a clip. Each embodiment includes means engaging the edges of the rim to prevent turning during operation of the rake. It will be obvious that more than one tooth could also be mounted on a single clip in a similar manner to that shown in the drawings of this invention.

Various changes can be made in the illustrative embodiments shown herein without departing from the scope of the invention.

What is claimed is:

1. A rake tooth mounting structure for use on a wheel hay rake in which a plurality of teeth are attached to the wheel rim in a substantially identical manner comprising
   (A) a rigid clip contoured to fit the periphery of the rim and having transverse radially inwardly turned flanges along at least a portion of each lateral edge of said clip to engage the edges of the rim and hold the clip in alignment therewith, said radially inner surface of the clip being longitudinally curved to a radius substantially identical to that of the periphery of the wheel rim,
   (B) means for fastening the clip to the rim, (C) at least one block of elastomeric material having one end attached to the radially outward surface of the clip, and (D) at least one tine having one end embedded in the block of elastomeric material extending therefrom in a direction substantially radially outwardly from the wheel with the outer portion of the tine inclined at an angle to the embedded portion.

2. The rake tooth structure of claim 1 in which each end of the clip is laterally widened to provide greater surface contact with the radially inner end of the elastomeric block.

3. The rake tooth structure of claim 1 in which only one tooth is mounted on each clip adjacent one end thereof and the hole for bolting the clip to the wheel rim is located in the end of the clip opposite the tooth.

References Cited

UNITED STATES PATENTS

| | | | |
|---|---|---|---|
| 2,909,889 | 10/1959 | Gustafson | 56—400 |
| 2,957,299 | 10/1960 | Gustafson et al. | 56—400 |
| 3,065,591 | 11/1962 | Gustafson | 56—400 |
| 3,102,377 | 9/1963 | Garrett | 56—400 |
| 3,157,019 | 11/1964 | Brackbill | 56—400 |
| 3,206,920 | 9/1965 | Hofer | 56—364 |
| 3,261,153 | 7/1966 | Johnston | 56—400 |

ALDRICH F. MEDBERY, *Primary Examiner.*